April 11, 1961  R. B. McKENZIE  2,979,140
MOLDBOARD PLOW FRAME CONSTRUCTION
Filed Jan. 28, 1957  2 Sheets-Sheet 1
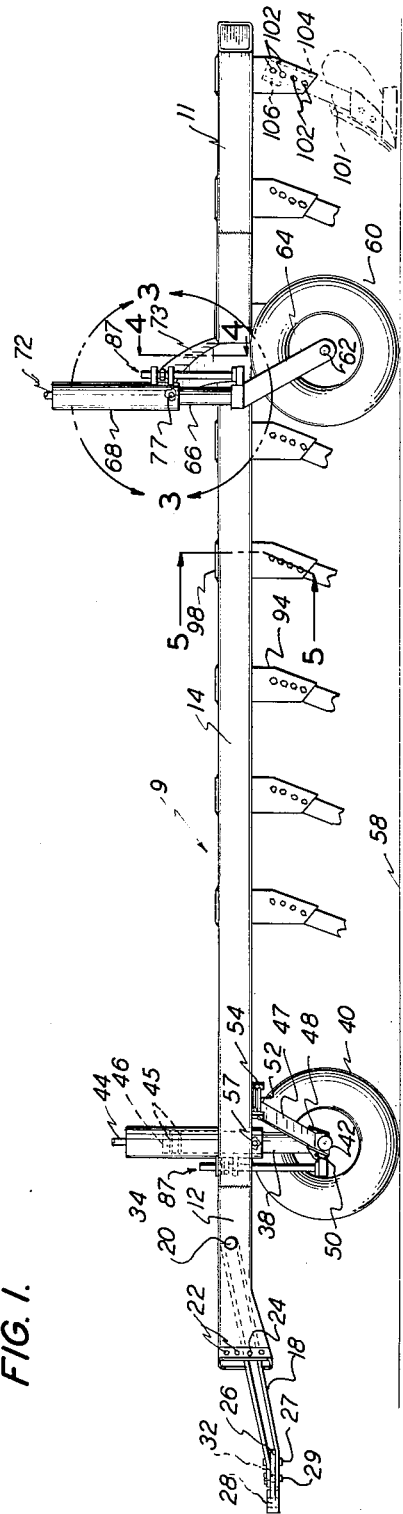
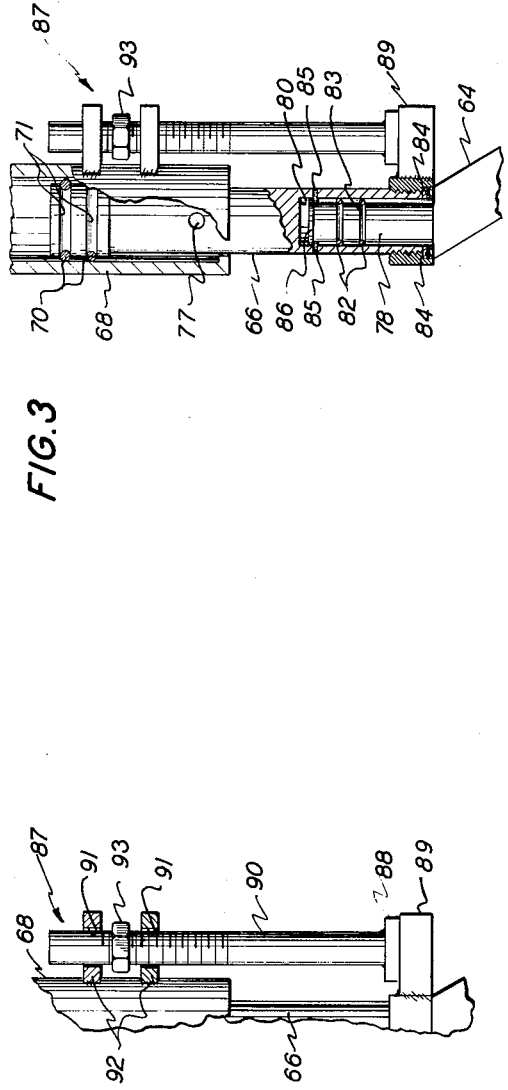
INVENTOR.
ROSS B. MC KENZIE
BY
Christie, Parker & Hale
ATTORNEYS April 11, 1961     R. B. McKENZIE     2,979,140
MOLDBOARD PLOW FRAME CONSTRUCTION
Filed Jan. 28, 1957     2 Sheets-Sheet 2
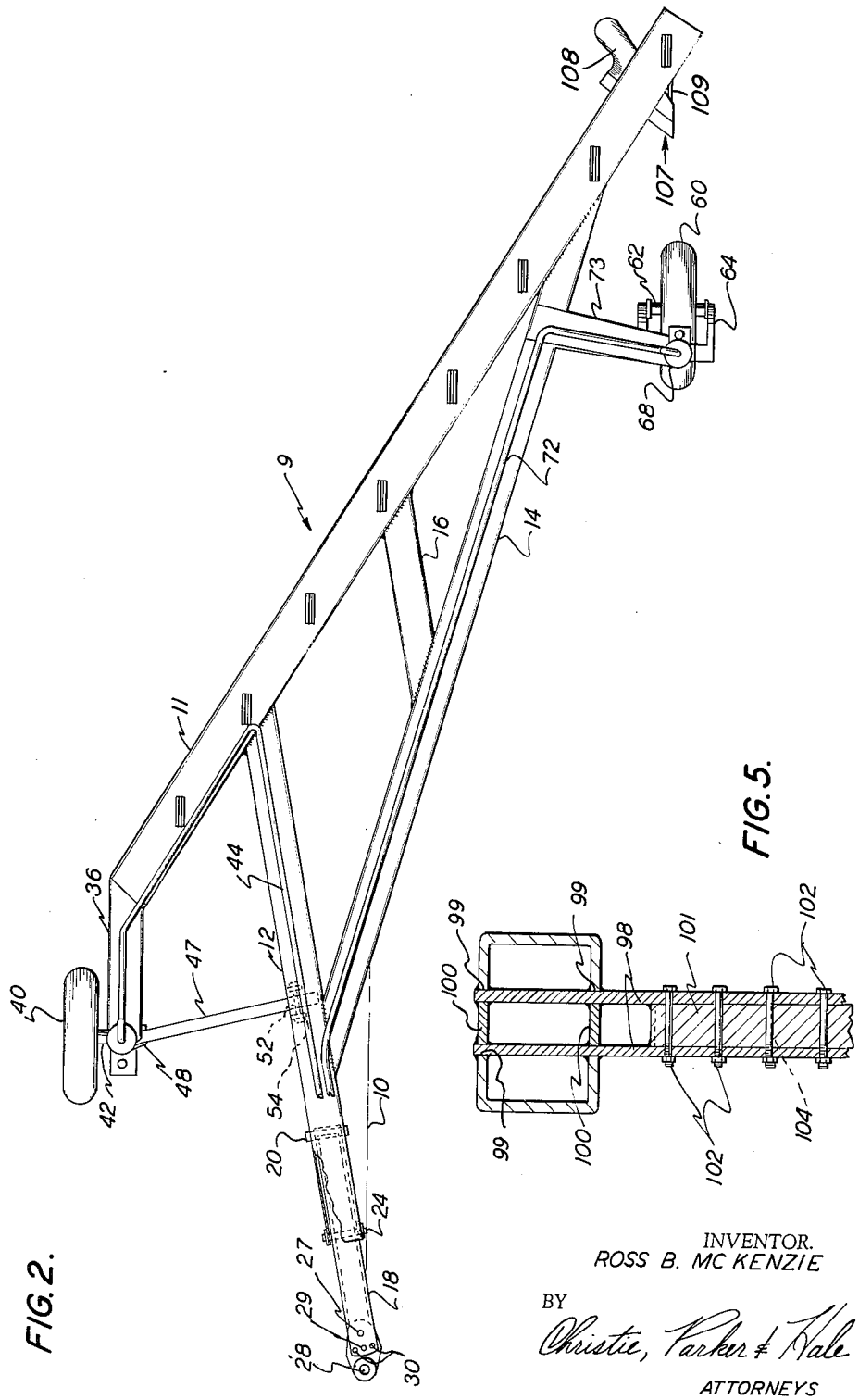
INVENTOR.
ROSS B. MCKENZIE
BY Christie, Parker & Hale
ATTORNEYS

United States Patent Office 2,979,140
Patented Apr. 11, 1961

2,979,140

MOLDBOARD PLOW FRAME CONSTRUCTION

Ross B. McKenzie, 8115 Rio Linda Blvd., Elverta, Calif.

Filed Jan. 28, 1957, Ser. No. 636,542

3 Claims. (Cl. 172—676)

This invention relates to plows, and more particularly, to plow frames for supporting a plurality of plowshares.

In the presently available plows, particularly those having more than three or four shares, difficulty is encountered in plowing at a constant depth. The presently available plows are attached through a beam to a towing tractor in such a manner that the beam can be displaced vertically with respect to the tractor during the plowing operation. This permits the plow frame to pivot about the horizontal axes of wheels supporting the plow and causes the shares to plow at variable depths. In addition, many conventional plows use a tail wheel adapted to run in a furrow at the rear of the plow frame and help control the depth of plowing. The disadvantage of this arrangement is that once the share which is plowing the furrow in which the tail wheel runs starts plowing a deeper or more shallow furrow, the tail wheel moves down or up, and aggravates the condition.

Due to the difficulty in maintaining constant plow depth with conventional plows, it is common practice to set the plowshares for a depth greater than is actually necessary, to be sure that a sufficient amount of earth is always turned. This increases the amount of power required to pull the plow and also increases the wear on the plow. Moreover, expensive and carefully designed plowshares are often required to aid in maintaining a constant plow depth with conventional plows.

This invention provides an improved plow frame adapted to be pulled behind a tractor or other suitable source of power which maintains the shares at a substantially constant plow depth over a wide range of plowing conditions. This is achieved by using a stiff hitch connection between the plow and the tractor so that the plow frame cannot readily pivot about a horizontal axis to the rear of the connection between the hitch and the tractor. The shares are held at a substantially constant depth, and need not be specially designed shares. The plow frame of this invention also greatly reduces the power requirements for pulling the plow, since the plowshares can be set at the exact plow depth desired.

Another disadvantage of conventional plows is that they cannot readily be backed up to clear plugging, such as occurs when plowing trashy ground. The plow frame of this invention can readily be backed up, not only to clear any plugging which may occur, but also to back up into inaccessible areas or "necks" which cannot be readily reached with a conventional plow.

Another advantage of the plow of this invention is that it has a short turning radius and can be made to "hook" when turning a corner in the field. This eliminates the formation of troublesome plowed "notches" at the corners of a plowed field, and facilitates the final diagonal plowing of the field from the central portion to the corners of the plowed field.

Briefly, the invention contemplates a plow frame which includes a transverse plowshare bar having means for attaching plowshares to it, and having a forwardly extending beam rigidly attached to it. Means are provided for attaching the beam to a tractor to provide a stiff hitch and prevent pivoting of the frame about a horizontal axis to the rear of the plow connection to the tractor. A pair of rotatable wheels are mounted on the frame to support it as it is pulled by the tractor.

In the preferred form of the invention, one wheel is set ahead of the other, and the rearmost (tail) wheel is disposed to run directly ahead of the rearmost share so that the rear wheel does not run in a plowed furrow. Thus, even if the rearmost share tends to change its plowing depth slightly, the tail wheel does not follow it, but instead, aids in maintaining a constant plow depth for the plowshares.

These and other aspects of the invention will be more fully understood from the following detailed description taken in conjunction with the accompanying drawings in which:

Fig. 1 is a side elevation of the preferred embodiment of the plow frame of this invention;

Fig. 2 is a plan view of the plow frame shown in Fig. 1;

Fig. 3 is an enlarged fragmentary view of Fig. 1 with parts removed;

Fig. 4 is an elevational view taken on line 4—4 of Fig. 1; and

Fig. 5 is a sectional view taken on line 5—5 of Fig. 1.

Referring to the drawings, a plow frame 9, adapted to be pulled in a direction indicated by center line 10, includes a horizontal plowshare bar 11 which extends obliquely with respect to the direction in which the plow is adapted to be drawn. A forwardly extending horizontal beam 12 is welded at its rear end to an intermediate portion of the plowshare bar, and is slightly oblique with respect to the direction in which the plow is adapted to be drawn. A horizontal and forwardly extending diagonal brace 14 is welded at its rear end to the rear portion of the plowshare bar, and at its forward end to an intermediate portion of the beam. As seen best in Fig. 2, the rear end of the beam is welded about half-way between the forward end and the center of the plowshare bar, and extends toward the center line of the plow frame.

A horizontal intermediate brace 16 is welded at its rear end to an intermediate portion of the plowshare bar and at its forward end to an intermediate portion of the diagonal brace. All of the frame members are of box girder construction, as shown for example at the rear end of the plowshare bar in Fig. 1.

A forwardly extending tongue 18 has its rear end connected by a horizontal and transverse pivot pin 20 inside the forward portion of the beam. The bottom portion of the forward end of the beam extends downwardly in a forward direction so that the tongue may be adjusted vertically through a substantial distance. A plurality of vertically spaced and transverse holes 22 in the forward end of the beam are adapted to receive a locking bolt 24 which extends through the tongue to lock it at a set angle, so that the tongue may be adjusted to fit tractor hitches of various heights. The rear end of a pad eye 26 is secured by a vertical pivot pin 27 to the forward end of the tongue. A hitching hole 28 in the forward end of the pad eye is adapted to receive a suitable connection to permit the plow frame to be attached to a tractor (not shown). A vertical locking bolt 29 is adapted to fit through any one of three laterally spaced holes 30 in the forward end of the tongue and a matching hole 32 in the intermediate portion of the pad eye. The center line of pull exerted by the tractor on the plow frame passes through the hitching hole in the pad eye, and may be shifted laterally to accommodate various field conditions. The tongue and beam form a rigid stiff hitch for the plow.

A forward vertical sleeve or cylinder 34 is welded at its lower end to the forward end of a longitudinal furrow wheel bracket 36, which in turn is welded at its rear end to the forward end of the plowshare bar. The lower end of the forward cylinder is open, and the upper end of a furrow wheel post or piston 38 extends up into the cylinder. A furrow wheel 40 is connected by a horizontal transverse axle 42 to the lower end of the forward wheel post. The upper end of the cylinder is supplied hydraulic fluid through a forward line 44 which extends from an intermediate portion of the beam back to the plowshare bar, forward along the plowshare bar and furrow bracket, and up and into the top of the forward cylinder. A pair of vertically spaced O-rings 45 mounted in grooves 46 on the upper end of the forward piston effect a sliding seal between the piston and the cylinder. Thus, the forward cylinder and forward end of the plow frame can be raised and lowered with respect to the furrow wheel by the application of fluid pressure through the forward fluid line, which is adapted to be coupled at its forward end to a hydraulic system (not shown) on the tractor.

The furrow wheel is locked from rotating about a vertical axis by an upwardly and inwardly extending transverse stabilizing arm 47 attached by a bracket 48 and a pivot bolt 50 at its lower end to the lower end of the furrow wheel piston. The upper and inner end of the stabilizing arm is bent to extend horizontally and disposed to slide laterally on a longitudinal bolt 52 secured at each end in a downwardly opening U-shaped bracket 54 welded to the underside of an intermediate portion of the beam. Thus, as the frame is raised and lowered with respect to the furrow wheel, the inner end of the stabilizing arm is free to slide laterally with respect to the frame, and the outer end of the arm can pivot about bolt 50. A horizontal bore 57 in the furrow wheel post is adapted to receive a stop bolt (not shown) on which the lower end of the cylinder can rest after being raised slightly from the position shown in Fig. 1. This arrangement permits the frame to be locked at an elevated position without requiring the continuous application of fluid pressure. With the frame locked in the upper position, the plowshares are lifted clear of ground level, indicated by line 58, so that the plow may be towed from one location to another.

The rear end of the plow frame is supported on a rotatable rear, or tail, wheel 60, which in turn is supported on a horizontal axle 62 extending through the lower end of a downwardly opening U-shaped wheel strut 64 attached at its upper end to the lower end of a vertical tail wheel piston 66 having its upper end disposed in a vertical tail wheel cylinder 68. A pair of vertically spaced O-rings 70 in a pair of grooves 71 around the upper end of the piston make a sliding seal with the interior of the cylinder, which is adapted to be supplied fluid pressure through a rear line 72 opening into the top of the cylinder. The lower end of the cylinder is welded to the outer end of an outwardly and upwardly extending arcuate tail wheel bracket 73, which is shaped to have its concave side opening downwardly, and which is attached at its lower end to the rear end of the diagonal brace. The tail wheel bracket is of sufficient length to hold the tail wheel far enough away from the plow frame and adjacent shares to permit the tail wheel to swivel freely 360° about the upright axis of the tail wheel piston. Fluid line 72 extends from the top of the tail wheel cylinder, down the tail wheel bracket, forward along the diagonal brace and terminates on the beam adjacent the forward fluid line, and is also adapted to be connected by a suitable coupling to a supply of fluid on the tractor. A separate valve (not shown) is provided for each fluid line so that the two ends of the plow frame may be raised independently of each other.

A transverse bore 77 in the tail wheel piston permits the frame to be locked in a raised position by the insertion of a locking pin (not shown) on which the lower end of the tail wheel cylinder rests, thus eliminating the need for the constant application of fluid pressure to the tail wheel cylinder to maintain the rear portion of the plow frame in a raised position.

Fig. 3 shows in detail how the tail wheel is mounted to swivel on the lower end of the tail wheel piston. A vertical tail wheel strut shank 78 is attached at its lower end to the upper end of the tail wheel strut, and extends up into a bore 80 in the lower end of the tail wheel piston. A pair of vertically spaced sleeve bearings 82 disposed in annular grooves 83 around the tail wheel shank aid free rotation of the tail wheel about a vertical axis. A thrust bearing 84 takes the thrust exerted by the lower end of the tail wheel piston on the upper end of the tail wheel strut. A pair of diametrically opposed Allen set screws 85 extend through the piston into bore 80 and engage the lower side of an annular flange 86 formed integrally on the upper end of the tail wheel strut socket to prevent the tail wheel from dropping inadvertently out of bore 80.

To avoid the requirement for constant application of fluid pressure to the two cylinders to maintain the plowshares at proper depth during a plowing operation, each cylinder and piston combination has a plow height adjustment 87. The tail wheel plow height adjustment is shown in detail in Fig. 4. A foot 88 is adapted to rest on a bottom stop 89 welded to the lower end of the tail wheel piston. The foot is attached to the lower end of a vertical plow height compression rod 90 which extends upwardly through a pair of collinear bores 91 in a pair of vertically spaced horizontal plates 92 welded to the lower portion of the tail wheel cylinder. The intermediate portion of the compression rod is threaded, and an adjusting nut 93 is disposed around the rod between the plates 92. Thus, the vertical position of foot 88 can be changed by rotating the adjusting nut to control the amount the frame is lowered with respect to the tail wheel when fluid pressure is removed from the tail wheel cylinder.

The plow height adjustment for the forward cylinder and piston is identical to that of the tail wheel assembly, and is not described in detail.

A plurality of downwardly extending plowshare brackets 94 are welded at equal intervals along the plowshare bar. In the plow frame shown in the drawings, eight plowshare brackets are provided on the plowshare bar, but any desired number can be attached to the frame.

Fig. 5 shows in detail how each plowshare bracket is mounted. A pair of laterally spaced vertical plates 98 having a major plane extending in the direction in which the frame is adapted to be drawn are welded at their upper ends in openings 99 provided in the top and bottom of the plowshare bar. Reinforcing blocks 100 are welded to the interior of plate 98 in the planes of the top and bottom of the plowshare bar. The upper end of a plowshare shank 101 (see Fig. 1) is secured in the lower end of the plowshare bracket by four horizontal transverse bolts 102. A lower shear stop 104 is welded to the lower portion of one of the plowshare bracket plates to the rear of the intermediate portion of the plowshare shank, and an upper shear stop 106 is welded to one of the plowshare bracket plates forward of the upper end of the plowshare shank. The two shear stops serve to take the shearing force off of the bolts during the plowing operation. A plowshare 107 (shown on the rearmost plowshare shank only), which includes a moldboard 108 and a land side 109, is attached to the lower end of each plowshare shank.

The operation of the plow is as follows: The tongue is hitched to the rear end of a tractor by means of the pad eye, which is adjusted laterally to provide the desired center line of pull. The tongue is also adjusted in a vertical plane to accommodate the height of the tractor towing attachment. The forward and rear hydraulic lines are each coupled to a source of hydraulic supply on the tractor, and the supply of fluid to each of the lines is controlled by separate respective valves on the tractor.

In making an initial run with the plow, the plow frame is set with respect to the wheels so that the plowshares extend down into the ground to plow to the required depth, the plow height adjustments 87 being set to the proper distance by means of adjusting nuts 93. On the next adjacent run, the furrow wheel runs in a furrow, and therefore, the forward cylinder is raised by an amount equal to the depth of the furrow by supplying fluid pressure to the forward cylinders and raising the plow frame to the new height. The forward adjusting nut 93 is turned up to the new position. Plowing then proceeds in a normal fashion.

It will be apparent that the furrow wheel could be permitted to pivot about an upright axis, and the tail wheel could be locked against such pivoting. However, the arrangement shown in the drawings provides the advantage of a shorter turning radius. An additional advantage is that when a corner is turned with the plow, that is, after the end of a run is reached, and the plow frame is temporarily raised to lift the plowshares out of the ground, the swiveling of the tail wheel permits the rear end of the plow to sweep around and overshoot the necessary amount of distance required to start a right angle run. This "hooking" permits the plow to plow a short hook at the beginning of each corner and eliminates the troublesome "notches" of plowed ground which interfere with proper final plowing from the center of the field out to the corners of the field.

Another advantage of the wheel mounting of this invention is that the plow frame can be backed up indefinitely to aid in unplugging of the plowshares, because the mounting of the tail wheel is such that it can swivel freely 360 degrees and not engage a plowshare or any portion of the frame. As shown in Fig. 2, the spacing between the tail wheel and the closest shares is sufficient to permit the mounting of conventional coulters (not shown) ahead of the shares, and still not interfere with free swiveling of the tail wheel.

As can be seen most clearly in Fig. 2, substantially all of the weight of the plow frame is concentrated over the line defined by the plowshares, eliminating the presence of unnecessary and undesirable weight spaced from the plowshare line as is the case wtih conventional multi-shear plows. The concentration of the weight of the plow frame of this invention over the plowshare line, together with the rigid mounting for the tongue, reduces the tendency for the plow frame to tilt or pivot about a horizontal axis, and thus insures the maintenance of the plowshares at a constant plowing depth over a wide variety of field conditions. This advantage is further enhanced by the mounting of the two support wheels substantially on the plowshare line. Thus, even if there is a tendency for the frame to tilt slightly about a horizontal axis, the relative vertical movement of the plowshares is a minimum due to the location of the wheels.

A further advantage of the plow frame of this invention is that the sleeve and post arrangement permits the plowshares to be readily raised a distance which is substantially greater than now possible with conventional plow frames which use a crank arrangement. This is an important advantage when plowing soft and trashy ground where the plow wheels tend to sink into the ground and permit the plowshares to drag on the ground when the plow is being turned to start a fresh series of furrows. With conventional plows the trash often plugs the plowshares, but with this plow, the plowshares are easily held well above the trash, and do not become plugged, thereby avoiding the time wasting operation of having to stop the plow to unplug the plowshares.

I claim:

1. A plow comprising an elongated and horizontal plowshare bar extending obliquely to the direction in which the plow is adapted to be pulled, a plurality of plowshares attached to the underside of the bar, each plowshare having a moldboard to turn a furrow and a landside to take the side pressure when the furrow is turned and resist lateral movement of the plowshare, a forwardly extending elongated and generally horizontal stiff hitch rigidly attached at its rear end to the plowshare bar to prevent any vertical movement of the hitch relative to the plowshare bar, means for attaching the forward end of the stiff hitch to a tractor, the stiff hitch being rigid for its entire length and firmly supported against vertical deflection at any point intermediate its ends, and a pair of wheels mounted on the plow along a line substantially parallel to the plowshare bar to support it as it is pulled by the tractor and to rotate about parallel axes which are substantially perpendicular to the direction in which the plow is to be pulled, one of the wheels being mounted at the forward end of the bar, and the other wheel being mounted at the rear end of the bar to ride on unplowed ground.

2. Apparatus according to claim 1 in which the rear wheel is mounted to ride on unplowed ground directly ahead of the rearmost plowshare.

3. A plow comprising an elongated transverse and horizontal plowshare bar extending obliquely to the direction in which the plow is adapted to be pulled, a plurality of plowshares attached to the underside of the bar, each plowshare having a moldboard to turn a furrow and a landside to take the side pressure when the furrow is turned and resist lateral movement of the plowshare, a forwardly extending elongated and generally horizontal stiff beam rigidly attached at its rear end to the plowshare bar to prevent any vertical movement of the beam relative to the plowshare bar, a forwardly extending generally horizontal tongue, means for attaching the forward end of the tongue to a tractor, means for attaching the rear portion of the tongue to the forward portion of the beam to permit the tongue to be pivoted in a substantially vertical plane with respect to the beam, and thereby be adjusted to any of a plurality of positions, means for firmly locking the tongue against pivoting and thereby hold it firmly in a fixed position with respect to the beam, the beam and tongue each being rigid for their entire respective lengths and firmly supported against vertical deflection relative to each other when the tongue is connected to the tractor, and a pair of wheels mounted on the plow along a line substantially parallel to the plowshare bar to support it as it is pulled by the tractor and to rotate about parallel axes which are substantially perpendicular to the direction in which the plow is to be pulled, one of the wheels being mounted at the forward end of the bar, and the other wheel being mounted at the rear end of the bar to ride on unplowed ground.

References Cited in the file of this patent
UNITED STATES PATENTS

| | | |
|---|---|---|
| 17,591 | Sutter | June 16, 1857 |
| 179,094 | Button et al. | June 27, 1876 |
| 717,455 | Sanders | Dec. 30, 1902 |
| 1,655,351 | Altgelt | Jan. 3, 1928 |
| 2,132,166 | Hester | Oct. 4, 1938 |
| 2,552,549 | Good | May 15, 1951 |
| 2,582,595 | Leveke | Jan. 15, 1952 |
| 2,625,089 | Pursche | Jan. 13, 1953 |